(12) United States Patent
Deng et al.

(10) Patent No.: US 12,164,113 B2
(45) Date of Patent: Dec. 10, 2024

(54) OPTICAL ENGINE AND AR DEVICE

(71) Applicant: GOERTEK OPTICAL TECHNOLOGY CO., LTD., Shandong (CN)

(72) Inventors: Yangchun Deng, Shandong (CN); Wangni Zhao, Shandong (CN); Qinglin Song, Shandong (CN)

(73) Assignee: GOERTEK OPTICAL TECHNOLOGY CO., LTD., Weifang (CN)

( * ) Notice: Subject to any disclaimer, the term of this patent is extended or adjusted under 35 U.S.C. 154(b) by 0 days.

(21) Appl. No.: 18/028,826

(22) PCT Filed: Aug. 30, 2021

(86) PCT No.: PCT/CN2021/115286
§ 371 (c)(1),
(2) Date: Mar. 28, 2023

(87) PCT Pub. No.: WO2022/062840
PCT Pub. Date: Mar. 31, 2022

(65) Prior Publication Data
US 2024/0053616 A1    Feb. 15, 2024

(30) Foreign Application Priority Data
Sep. 28, 2020    (CN) .......................... 202011038510.X (51) Int. Cl.
*G02B 27/09*    (2006.01)
*G03B 21/20*    (2006.01)

(52) U.S. Cl.
CPC ..... *G02B 27/0955* (2013.01); *G03B 21/2006* (2013.01); *G03B 21/208* (2013.01)

(58) Field of Classification Search
None
See application file for complete search history.

(56) References Cited

U.S. PATENT DOCUMENTS

| 5,559,637 A | 9/1996 | Moskovich |
| 2017/0068076 A1 | 3/2017 | Ito et al. |
| 2019/0072747 A1* | 3/2019 | Shi ..................... G02B 27/0101 |
| 2020/0400928 A1* | 12/2020 | Wang .................... G02B 13/16 |

FOREIGN PATENT DOCUMENTS

| CN | 1756980 A | 4/2006 |
| CN | 101971637 A | 2/2011 |
| CN | 102778746 A | 11/2012 |
| CN | 105629478 | * 1/2016 |
| CN | 105739084 A | 7/2016 |

(Continued)

OTHER PUBLICATIONS

International Search Report from International Application No. PCT/CN2021/115286 mailed Nov. 18, 2021.

*Primary Examiner* — Ashok Patel
(74) *Attorney, Agent, or Firm* — Shih IP Law Group, PLLC (57) ABSTRACT

The present disclosure discloses an optical engine and an AR device. The optical engine includes a self-luminous display chip and a lens assembly provided on a light outlet side of the self-luminous display chip, wherein the lens assembly includes at least three lenses. The above solution solves the technical problem of large volume of optical engine.

9 Claims, 3 Drawing Sheets

(56) References Cited

FOREIGN PATENT DOCUMENTS

| | | | |
|---|---|---|---|
| CN | 108064352 A | | 5/2018 |
| CN | 108279485 A | | 7/2018 |
| CN | 109581669 A | | 4/2019 |
| CN | 110858032 A | | 3/2020 |
| CN | 111258069 A | | 6/2020 |
| CN | 111880363 A | | 11/2020 |
| CN | 212781467 U | | 3/2021 |
| TW | 1479223 | * | 1/2015 |

* cited by examiner

OPTICAL ENGINE AND AR DEVICE

TECHNICAL FIELD

The present disclosure relates to the field of projection imaging, and particularly, to an optical engine and an AR device.

DESCRIPTION OF RELATED ART

Micro projection technology has gaining population. Due to its small size, easy to move, and less requirements for application environment, it has been applied in more and more fields. With the development of the micro projection technology, the requirements for optical engines are increasingly higher. However, it is necessary to ensure the performance of the optical engines while miniaturizing its volume. Generally, a conventional optical engine has a volume of at least 10 cubic centimeters, but it is still too large in some situations.

SUMMARY

A main purpose of the present disclosure is to provide an optical engine, which aims to solve a technical problem of large volume of the optical engine.

To achieve the above purpose, the present disclosure provides an optical engine, comprising: a self-luminous display chip; and a lens assembly provided on a light outlet side of the self-luminous display chip, herein, the lens assembly includes at least three lenses.

Optionally, a total focal length of the lens assembly ranges from 10 to 13 mm.

Optionally, the lens assembly includes a first lens, a second lens and a third lens sequentially from an image side to an object side, and the third lens is positioned between the second lens and the self-luminous display chip, Optionally, the first lens is a positive meniscus lens, the second lens is a negative meniscus lens, and the third lens is a biconvex lens.

Optionally, the first lens includes a first surface and a second surface, and both the first surface and the second surface are spherical surfaces. The second lens includes a third surface and a fourth surface, and both the third surface and the fourth surface are even order aspherical surfaces. The third lens includes a fifth surface and a sixth surface, and both the fifth surface and the sixth surface are even order aspherical surfaces.

Optionally, the lens assembly includes a first lens, a second lens and a third lens sequentially from an image side to an object side, and the third lens is positioned between the second lens and the self-luminous display chip, Optionally, the first lens is a positive meniscus lens, the second lens is a biconcave lens, and the third lens is a positive meniscus lens.

Optionally, the first lens includes a first surface and a second surface, and both the first surface and the second surface are even order aspherical surfaces. The second lens includes a third surface and a fourth surface, and both the third surface and the fourth surface are even order aspherical surfaces. The third lens includes a fifth surface and a sixth surface, and both the fifth surface and the sixth surface are spherical surfaces.

Optionally, the self-luminous display chip is a Micro LED self-luminous display chip or a FL-LCOS self-luminous display chip.

Optionally, a total length of the optical engine ranges from 17 to 19 mm.

Optionally, the optical engine further includes: a light uniform structure positioned between the lens assembly and the self-luminous display chip; and/or a chip protection glass provided on a surface of the self-luminous display chip.

In order to achieve the above purpose, the present disclosure also provides an AR device comprising the above optical engine.

According to the technical solution of the present disclosure, the optical engine includes a self-luminous display chip and a lens assembly provided on a light outlet side of the self-luminous display chip, and the lens assembly includes at least three lenses. The self-luminous display chip may emit light itself and output the light, and the lens assembly transfers the light output from the self-luminous display chip to outside for realizing micro projection. In the above technical solution, the light source module of the optical engine, such as a DLP (Digital Light Processing) light source module, and a RTIR (real-time infrared) module or a TIR (infrared) module of a DLP display chip, and a PBS (Polarizing Beam Splitter) polarizing beam splitter module of a LCOS (Liquid Crystal On Silicon) display chip, can be omitted by using the self-luminous display chip, thus the volume of the optical engine is greatly reduced by omitting some of the components of the optical engine. Compared with the optical engine with the light source module and the polarizing beam splitter module, the volume of the optical engine is reduced by about 60%, which solves the technical problem of large volume of the optical engine.

BRIEF DESCRIPTION OF DRAWINGS

In order to illustrate the solutions of the present disclosure or the prior art more clearly, the drawings for describing the contents of the embodiments or the prior art will be introduced briefly below. Of cause, the drawings merely illustrate several embodiments of the present disclosure, and for those skilled in the art, other embodiments can also be obtained from the structure illustrated in these drawings by those skilled in the art without any creative work.

The achievement, functional features and advantages of the present disclosure will be further described with reference to the drawing in combination with the embodiments.

DETAILED DESCRIPTIONS

The technical solution in the embodiment of the present disclosure will be described clearly and completely in the following description, in combination with the drawings. Expressions such as "first", "second", etc. in the present disclosure, are only used for the purpose of illustration, and should not be construed as limitations to the numbers or orders of the indicated elements or components. Therefore, the feature defined by using "first" and "second" may explicitly or implicitly includes at least one of the features.

The present disclosure provides an optical engine, which aims to reduce volume of the optical engine.

In exemplary arts, the optical engine generally uses a DLP (Digital Light Processing) display chip and a LCOS (Liquid Crystal On Silicon) display chip to output light, but the DLP (Digital Light Processing) display chip and the LCOS (Liquid Crystal On Silicon) display chip require additional light source modules, including a RTIR (Real Time Infrared) module or a TIR (Infrared) module that are essential to the DLP light source module, and a PBS (Polarizing Beam Splitter) polarizing beam splitter module that is essential for the LCOS (Liquid Crystal On Silicon) display chip.

Figure 1:
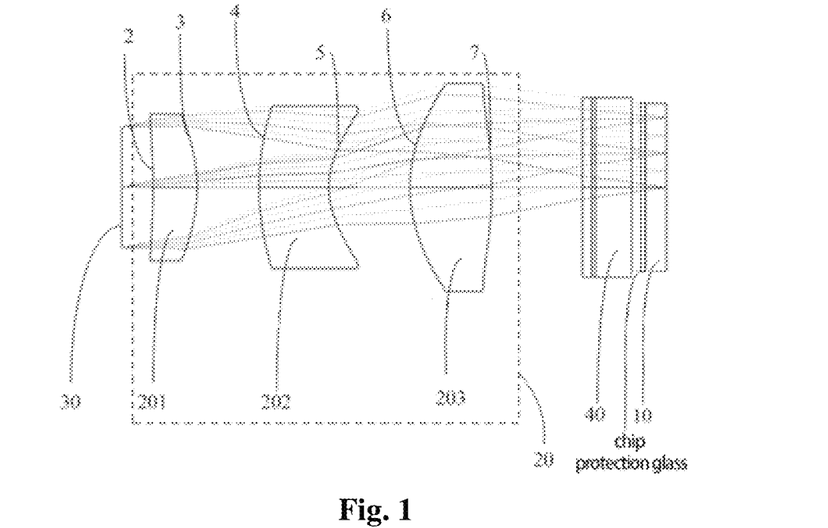
FIG. 1 is a schematic diagram of a structure of an optical engine of an embodiment of the present disclosure.

In an embodiment, as shown in FIG. 1, the optical engine includes a self-luminous display chip 10 and a lens assembly 20 provided on a light outlet side of the self-luminous display chip 10, and the lens assembly 20 includes at least three lenses.

The self-luminous display chip 10 may emit light itself and output the light, and the lens assembly 20 transfers the light output from the self-luminous display chip 10 to outside for realizing micro projection. In such a technical solution, the light source module of the optical engine, such as the DLP (Digital Light Processing) light source module, and the RTIR (real-time infrared) module or the TIR (infrared) module of the DLP display chip, and the PBS (Polarizing Beam Splitter) polarizing beam splitter module of the LCOS (Liquid Crystal On Silicon) display chip, can be omitted by using the self-luminous display chip 10, and thus the volume of the optical engine can be greatly reduced by omitting the components of the optical engine. Compared with the optical engine with the light source module and the polarizing beam splitter module, the volume of the optical engine is reduced by about 60%, which solves the technical problem of large volume of the optical engine.

Optionally, the self-luminous display chip 10 is a Micro LED self-luminous display chip 10 or a FL-LCOS (front lit liquid crystal on silicon) self-luminous display chip 10.

Optionally, a focal length of the optical engine is a total focal length of a lens group including a first lens 201, a second lens 202 and a third lens 203. The sum of a first focal length 201 and a third focal length 203 is larger than the total focal length. The second lens 202 has a negative focal length. The above combination can satisfy the requirements of amplification and reduction of the projection of the optical engine, and it is easy to form various lens groups for optical engines that meet the design requirements in actual design, expanding the application range of the miniaturized optical engine.

In an embodiment, as shown in FIG. 1, the lens assembly 20 includes a first lens 201, a second lens 202 and a third lens 203 arranged sequentially from an image side to an object side, the third lens 203 is positioned between the second lens 202 and the self-luminous display chip. The first lens 201 is a positive meniscus lens. The second lens 202 is a negative meniscus lens. The third lens 203 is a biconvex lens.

The above combination can satisfy the requirements of amplification and reduction of the projection of the optical engine, and it is easy to form various lens groups for optical engines that meet the design requirements in actual design, expanding the application range of the miniaturized optical engine.

Based on the above features, a first embodiment is taken as following to illustrate the beneficial effects of the technical solution. A miniaturized optical engine design is performed with FOV (field of view)=28° and CRA (Chief Ray Angle)<2°. The parameter solution of the designed optical engine is: the total length of the lens is 18 mm, the total focal length is 10.673 mm, the image height is 5.512 mm, FOV=28° and CRA<2°. The focal length of the first lens 201 is 10.855 mm, the focal length of the second lens 202 is −6.700 mm, and the focal length of the third lens 203 is 6.523 mm Herein, more detailed lens parameters are shown in the following table 1.

TABLE 1

| surface number | | radius of curvature (mm) | thickness (mm) | refractive index (Nd) | abbe value (Vd) | vertex curvature | α2 | α3 | |
|---|---|---|---|---|---|---|---|---|---|
| STOP | | Infinity | Infinity | | | | | | |
| | | Infinity | 1.024 | | | | | | |
| first lens | 2 | −29.585 | 1.465 | 1.55 | 62.7 | 25.431 | | | spherical surface |
| | 3 | −5.030 | 2.044 | | | −3.431 | | | spherical surface |
| second lens | 4 | 7.720 | 2.305 | 1.64 | 22.4 | −12.227 | 1.28E−03 | −2.67E−05 | aspheric surface |
| | 5 | 2.440 | 2.681 | | | −2.753 | 4.61E−04 | 4.98E−05 | aspheric surface |
| third lens | 6 | 4.551 | 2.711 | 1.54 | 55.7 | −3.033 | 9.37E−04 | 8.71E−06 | aspheric surface |
| | 7 | −11.865 | 3.000 | | | −3.002 | 9.20E−04 | 3.02E−05 | aspheric surface |
| structure such as chip protection glass | 8 | Infinity | 2.77 | 1.52 | 54.5 | | | | |
| | IMAGE | Infinity | 1.465 | | | | | | |

Figure 3:
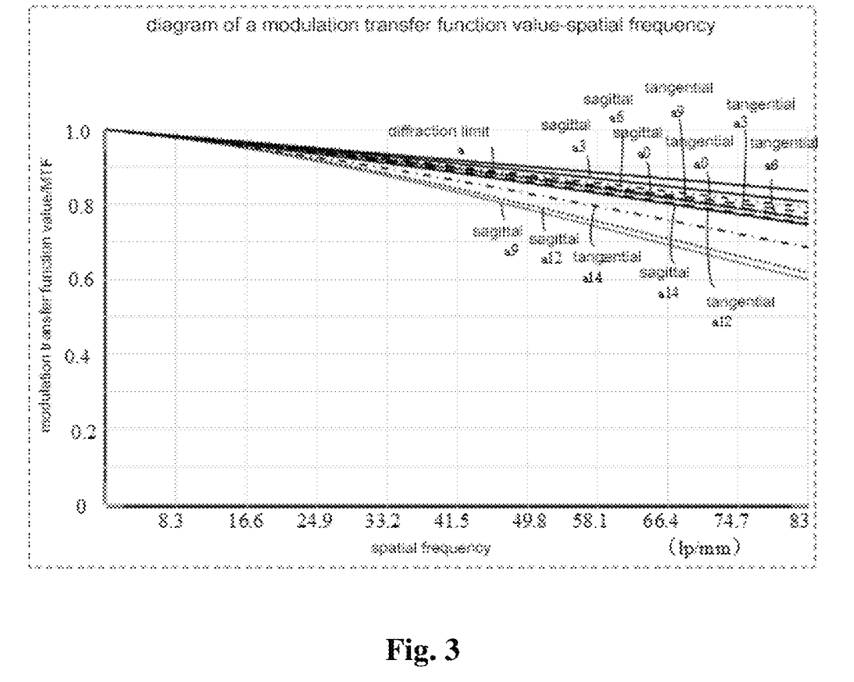
FIG. 3 is a schematic diagram of a modulation transfer function value-spatial frequency of an optical engine of a first embodiment of the present disclosure.
Figure 4:
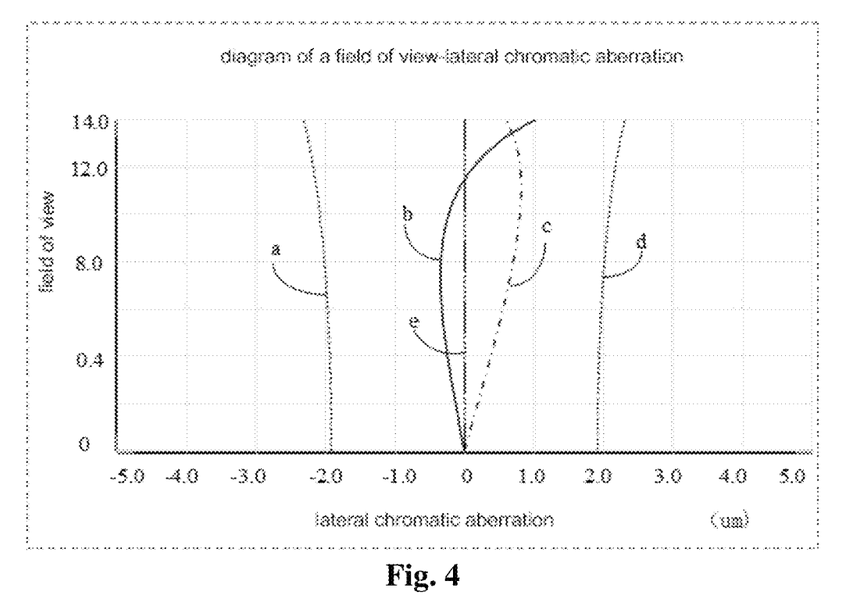
FIG. 4 is a schematic diagram of a field of view-lateral chromatic aberration of a chip surface of the optical engine of the present disclosure.

Herein, the volume of the optical engine can be 4 cubic centimeters. The schematic diagram of spatial frequency-optical transfer function of the optical engine is as shown in FIG. 3, the wavelength range is selected from 470 nm to 650 nm, and the modulation transfer function values in a tangential plane (Tangential, T) and a sagittal plane (Sagittal, S) are illustrated when the half field of views are 0°, 3°, 6°, 9°, 12° and 14° respectively. The line indicated as diffraction limit in FIG. 3 is a modulation transfer function value-spatial frequency curve in the tangential plane and the sagittal plane when the half field of view is the diffraction limit, the line indicated as tangential a0 in FIG. 3 is a modulation transfer function value-spatial frequency curve in the tangential plane when the half field of view is 0°, the line indicated as tangential a3 in FIG. 3 is a modulation transfer function value-spatial frequency curve in the tangential plane when the half field of view is 3°, the line indicated as tangential a6 in FIG. 3 is a modulation transfer function value-spatial frequency curve in the tangential plane when the half field of view is 6°, the line indicated as tangential a9 in FIG. 3 is a modulation transfer function value-spatial frequency curve in the tangential plane when the half field of view is 9°, the line indicated as tangential a12 in FIG. 3 is a modulation transfer function value-spatial frequency curve in the tangential plane when the half field of view is 12°, the line indicated as tangential a14 in FIG. 3 is a modulation transfer function value-spatial frequency curve in the tangential plane when the half field of view is 14°, the line indicated as sagittal a0 in FIG. 3 is a modulation transfer function value-spatial frequency curve in the sagittal plane when the half field of view is 0°, the line indicated as sagittal a3 in FIG. 3 is a modulation transfer function value-spatial frequency curve in the sagittal plane when the half field of view is 3°, the line indicated as sagittal a6 in FIG. 3 is a modulation transfer function value-spatial frequency curve in the sagittal plane when the half field of view is 6°, the line indicated as sagittal a9 in FIG. 3 is a modulation transfer function value-spatial frequency curve in the sagittal plane when the half field of view is 9°, the line indicated as sagittal a12 in FIG. 3 is a modulation transfer function value-spatial frequency curve in the arc direction when the half field of view is 12°, and the line indicated as sagittal a14 in FIG. 3 is a modulation transfer function value-spatial frequency curve in the arc direction when the half field of view is 14°. Specifically, the modulation transfer function (MTF) values of spatial frequencies ranging from 0 lp/mm to 83 lp/mm (spatial logarithms of lines per millimeter) range from 0.6 to 1.0, and the modulation transfer function values for center field of view (which refers to a 0° field of view) range from 0.83 to 1.0, which indicates that the final projected image has a high resolution and that this lens group has better optical performance. Herein, MTF=(Imax−Imin)/(Imax+Imin), and the larger the LP/mm, the smaller the MTF value. Using the above data for simulation, the schematic diagram of the measured field of view-lateral chromatic aberration is shown in FIG. 4. In FIG. 4, a and d are field of view-lateral chromatic aberration curves of Airy disk, b is a field of view-lateral chromatic aberration curve of a wavelength of 0.5876 μm, and c is a field of view-lateral chromatic aberration curve of a wavelength of 0.4861 μm. D is a center 0 line and a field of view-lateral chromatic aberration curve of a wavelength of 0.5876 μm.

Herein, the lens chromatic aberration of the optical engine is small and is less than a size of one pixel.

Optionally, the first lens 201 includes a first surface 2 and a second surface 3, the first surface 2 and the second surface 3 are spherical surfaces. The second lens 202 includes a third surface 4 and a fourth surface 5, and the third surface 4 and the fourth surface 5 are even order aspherical surfaces. The third lens 203 includes a fifth surface 6 and a sixth surface 7, the fifth surface 6 and the sixth surface 7 are even order aspherical surfaces.

The volume of the optical engine can be further reduced by adopting the third surface 4, the fourth surface 5, the fifth surface 6 and the sixth surface 7 as even order aspherical surfaces. In addition, the first surface 2 and the second surface 3 provided as spherical surfaces can also save mold costs.

Optionally, the first lens 201 may be a lens made of plastic or glass, the second lens 202 may be a lens made of plastic or glass, and the third lens 203 may be a lens made of plastic or glass. In actual design, a lens using a plastic lens to be designed as a spherical surface may minimize mold costs.

Optionally, in the first embodiment, the distance between the first lens 201 and the second lens 202 is 2.044 mm, the distance between the second lens 202 and the third lens 203 is 2.681 mm, and the distance between the third lens 203 and the chip protection glass is 3.000 mm. When defining the optical engine using the above parameters, it has good optical performance and a smaller volume.

Optionally, the total focal length of the lens assembly 20 ranges from 10 to 13 mm.

The total focal length ranging from 10 to 13 mm can satisfy the general design requirements of the current projecting optical engine, and can ensure the projection effect of projecting on a projection surface 30 by the optical engine while reducing the volume. Optionally, the projection surface 30 may be a projection screen or an optical waveguide structure.

Optionally, a total length of the optical engine ranges from 17 to 19 mm.

Herein, when the total length of the optical engine ranges from 17 to 19 mm, it has an optimal volume ratio. When the total length of the optical engine is less than 17 mm, the aperture of the optical engine will significantly increase as the total length of the optical engine decreases, resulting in an increase in volume. When the total length of the optical engine is greater than 19 mm, the volume of the optical engine will significantly increase as the total length of the optical engine increases.

Figure 2:
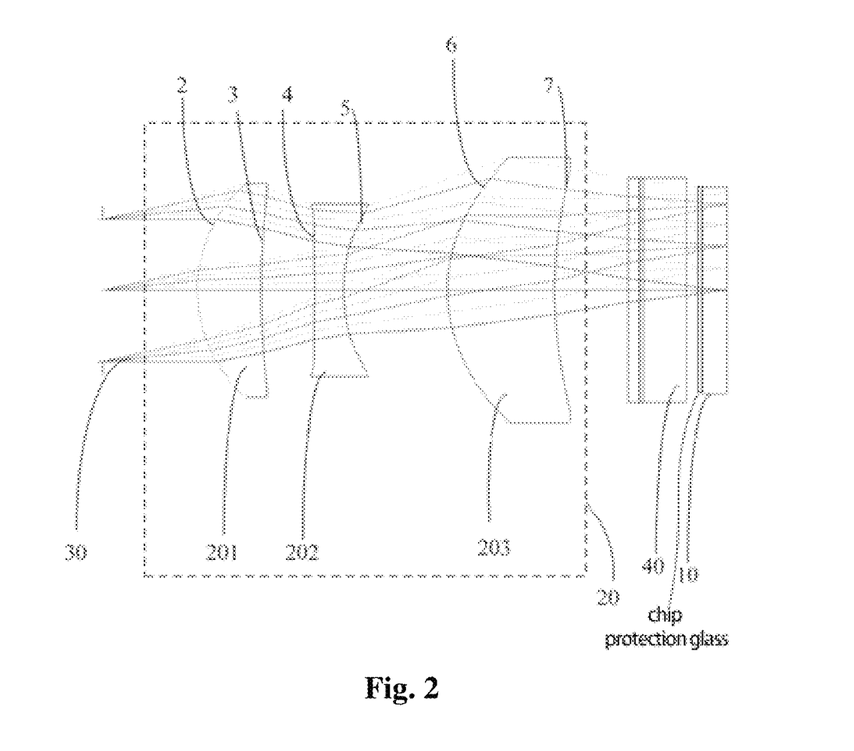
FIG. 2 is a schematic diagram of a structure of an optical engine of an embodiment of the present disclosure.

In an embodiment, as shown in FIG. 2, the lens assembly 20 includes a first lens 201, a second lens 202 and a third lens 203 sequentially from an image side to an object side, and the third lens is positioned between the second lens 202 and the self-luminous display chip. The first lens 201 is a positive meniscus lens, the second lens 202 is a biconcave lens, and the third lens 203 is a positive meniscus lens.

The above combination can satisfy the requirements of amplification and reduction of the projection of the optical engine, and it is easy to form various lens groups for optical engines that meet the design requirements in actual design, expanding the application range of the miniaturized optical engine.

Based on the above features, a second embodiment is taken as following to illustrate the beneficial effects of the technical solution. A miniaturized optical engine design is performed with FOV (field of view)=28° and CRA (Chief Ray Angle)=3.3°. The parameter solution of the designed optical engine is: the total length of the lens is 17.5 mm, the total focal length is 12.025 mm, the image height is 5.512 mm, FOV=28° and CRA=3.3°. The focal length of the first lens 201 is 8.613 mm, the focal length of the second lens 202 is −7.285 mm, and the focal length of the third lens 203 is 10.669 mm Herein, the more detailed lens parameters are shown in the following table 2.

TABLE 2

| | surface number | radius of curvature (mm) | thickness (mm) | refractive index (Nd) | abbe value (Vd) | vertex curvature α | α1 | α2 | α3 | α4 | α5 | |
|---|---|---|---|---|---|---|---|---|---|---|---|---|
| | STOP | Infinity | Infinity | | | | | | | | | |
| | | Infinity | 2.665 | | | | | | | | | |
| first lens | 2 | 3.948 | 1.780 | 1.54 | 55.7 | −0.121 | | −3.39E−04 | −2.35E−05 | 8.15E−06 | 8.23E−08 | aspheric surface |
| | 3 | 23.205 | 1.500 | | | 30.001 | | −1.13E−05 | 4.81E−05 | −2.20E−05 | 8.76E−07 | aspheric surface |
| second lens | 4 | −22.457 | 0.823 | 1.64 | 22.4 | −30.001 | | 1.14E−02 | −1.77E−03 | 7.62E−07 | −3.73E−06 | aspheric surface |
| | 5 | 5.994 | 2.914 | | | 2.470 | | 1.36E−02 | −1.13E−03 | −2.20E−04 | 1.90E−05 | aspheric surface |
| third lens | 6 | 4.321 | 3.011 | 1.57 | 49.4 | −0.628 | | | | | | spherical surface |
| | 7 | 11.167 | 2.062 | | | −10.351 | | | | | | spherical surface |
| structure such as chip protection glass | 8 | Infinity | 2.77 | 1.52 | 54.5 | | | | | | | |
| | IMAGE | Infinity | | | | | | | | | | |

Figure 5:
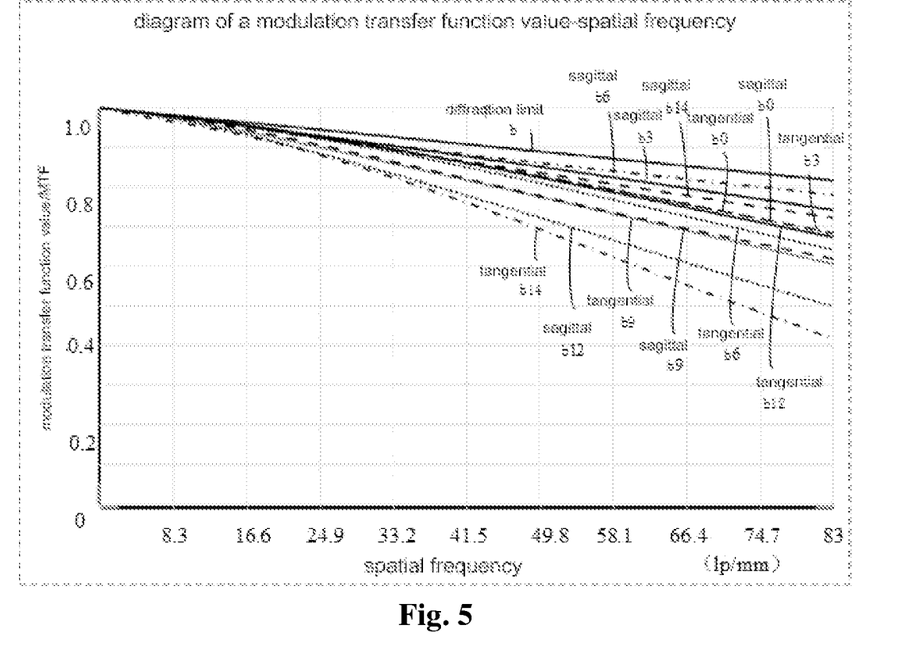
FIG. 5 is a schematic diagram of an optical transfer function value-spatial frequency of an optical engine of a second embodiment of the present disclosure.
Figure 6:
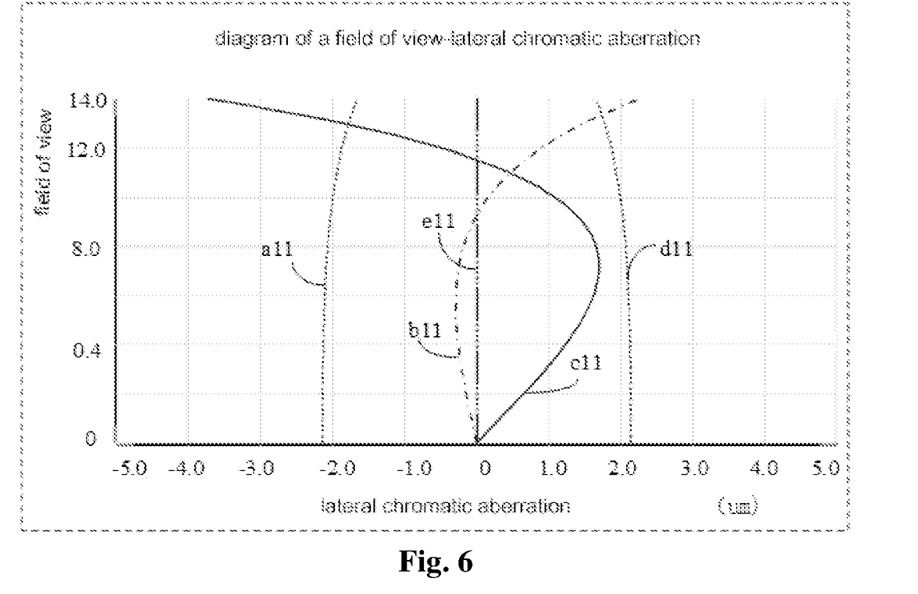
FIG. 6 is a schematic diagram of field of view-lateral chromatic aberration of an optical engine of a second embodiment of the present disclosure.

Herein, the volume of the optical engine can be 4 cubic centimeters. The effect of the schematic diagram of spatial frequency-optical transfer function of the optical engine is as shown in FIG. 5, the wavelength range is selected from 470 nm to 650 nm, and the modulation transfer function value-spatial frequency curve in the tangential plane (Tangential, T) and the sagittal plane (Sagittal, S) are illustrated when the half field of views are 0°, 3°, 6°, 9°, 12° and 14° respectively. The line indicated as diffraction limit b in FIG. 5 is a modulation transfer function value-spatial frequency curve in the tangential plane and the sagittal plane when the half field of view is the diffraction limit, the line indicated as tangential b0 in FIG. 5 is a modulation transfer function value-spatial frequency curve in the tangential plane when the half field of view is 0°, the line indicated as tangential b3 in FIG. 5 is a modulation transfer function value-spatial frequency curve in the tangential plane when the half field of view is 3°, the line indicated as tangential b6 in FIG. 5 is a modulation transfer function value-spatial frequency curve in the tangential plane when the half field of view is 6°, the line indicated as tangential b9 in FIG. 5 is a modulation transfer function value-spatial frequency curve in the tangential plane when the half field of view is 9°, the line indicated as tangential b12 in FIG. 5 is a modulation transfer function value spatial frequency curve in the tangential plane when the half field of view is 12°, the line indicated as tangential b14 in FIG. 5 is a modulation transfer function value-spatial frequency curve in the tangential plane when the half field of view is 14°, the line indicated as sagittal b0 in FIG. 5 is a modulation transfer function value-spatial frequency curve in the sagittal plane when the half field of view is 0°, the line indicated as sagittal b3 in FIG. 5 is a modulation transfer function value spatial frequency curve in the sagittal plane when the half field of view is 3°, the line indicated as sagittal b6 in FIG. 5 is a modulation transfer function value-spatial frequency curve in the sagittal plane when the half field of view is 6°, the line indicated as sagittal b9 in FIG. 5 is a modulation transfer function value-spatial frequency curve in the sagittal plane when the half field of view is 9°, the line indicated as sagittal b12 in FIG. 5 is a modulation transfer function value-spatial frequency curve in the sagittal plane when the half field of view is 12°, and the line indicated as arc b14 in FIG. 5 is a modulation transfer function value-spatial frequency curve in the arc direction when the half field of view is 14°. Specifically, the modulation transfer function (MTF) values of spatial frequencies ranging from 0 lp/mm to 83 lp/mm range from 0.41 and 1.0, and the modulation transfer function values for center field of view (which refers to a 0° field of view) range from 0.83 and 1.0, which indicates that the final projected image has a high resolution and that this lens group has better optical performance. Herein, MTF=(Imax−Imin)/(Imax+Imin), and the larger the LP/mm, the smaller the MTF value. Using the above data for simulation, the schematic diagram of the measured field of view-lateral chromatic aberration is shown in FIG. 6. In FIG. 6, a11 and d11 are the field of view-lateral chromatic aberration curves of Airy disk, b11 is a field of view-lateral chromatic aberration curve of a wavelength of 0.5876 μm, and c11 is a field of view-lateral chromatic aberration curve of a wavelength of 0.4861 μm. D11 is a center 0 line and is a field of view-lateral chromatic aberration curve of a wavelength of 0.5876 μm. Herein, the lens chromatic aberration of the optical engine is small and is less than the size of one pixel.

Optionally, the first lens 201 includes a first surface 2 and a second surface 3, and the first surface 2 and the second surface 3 are even order aspherical surfaces. The second lens 202 includes a third surface 4 and a fourth surface 5, and the third surface 4 and the fourth surface 5 are even order aspherical surfaces. The third lens 203 includes a fifth surface 6 and a sixth surface, and the fifth surface 6 and the sixth surface 7 are spherical surfaces.

The volume of the optical engine can be further reduced by adopting the third surface 4, the fourth surface 5, the fifth surface 6 and the sixth surface 7 as even order aspherical surfaces. In addition, the first surface 2 and the second surface 3 provided as spherical surfaces can also save mold costs.

In the second embodiment, the distance between the first lens 201 and the second lens 202 is 1.500 mm, the distance between the second lens 202 and the third lens 203 is 2.914 mm, and the distance between the third lens 203 and the chip protection glass is 2.062 mm. When defining the optical engine using the above parameters, it has good optical performance and a smaller volume.

Optionally, the first lens 201 includes a first surface 2 and a second surface 3, and the first surface 2 and the second surface 3 are even order aspherical surfaces. The second lens 202 includes a third surface 4 and a fourth surface 5, and the third surface 4 and the fourth surface 5 are even order aspherical surfaces. The third lens 203 includes a fifth surface 6 and a sixth surface 7, and the fifth surface 6 and the sixth surface 7 are spherical surfaces.

The volume of the optical engine can be further reduced by adopting the first surface 2, the second surface 3, the third surface 4 and the fourth surface 5 as even order aspherical surfaces. In addition, the fifth surface 6 and the sixth surface 7 provided as spherical surfaces can also save mold costs.

In an embodiment, an even order aspherical surface determines a position Z at a height Y along an optical axis direction according to the following formula;

$$z = \frac{CY^2}{1+\sqrt{1+(1+k)C^2Y^2}} + \sum_{i=2}^{N}\alpha_i Y^{2i}$$

Herein, Y is the height of the mirror center, Z is the position of the aspherical structure along the optical axis direction at a height of Y, the surface vertex is used as reference for calculating distance from the optical axis, C is the radius of curvature of the aspherical vertex, K is the coning coefficient, and a, represents the aspherical coefficient of the i-th order.

Referring to FIGS. 3 and 6, the first five order aspherical coefficients of the two embodiments are illustrated respectively.

Optionally, referring to FIGS. 1 and 2, the optical engine further includes a light uniform structure 40 and a chip protection glass, and the light uniform structure 40 is positioned between the first lens 201 and the self-luminous display chip 10.

The chip protection glass is provided on the surface of the self-luminous display chip 10. The light uniform structure 40 unifies the light output of the chip, and the chip protection glass can protect the chip without affecting its light output.

Optionally, referring to FIGS. 1 and 2, the optical engine further includes a light uniform structure 40, and the light uniform structure 40 is positioned between the lens assembly 20 and the self-luminous display chip 10. The light uniform structure 40 unifies the light output of the chip.

Optionally, referring to FIGS. 1 and 2, the optical engine further includes a chip protection glass positioned on a surface of the self-luminous display chip 10. The chip protection glass can protect the chip without affecting its light emission.

Optionally, the total focal length of the lens assembly 20 ranges from 10 to 13 mm.

The total focal length ranging from 10 to 13 mm can satisfy the general design requirements of the current projecting optical engine, and can ensure the projection effect of projecting on the projection surface 30 by the projecting optical engine while reducing the volume.

Optionally, the total length of the optical engine ranges from 17 to 19 mm.

Herein, when the total length of the optical engine ranges from the range of 17 to 19 mm, it has an optimal volume ratio. When the total length of the optical engine is less than 17 mm, the aperture of the optical engine will significantly increase as the total length of the optical engine decreases, resulting in an increase in volume. When the total length of the optical engine is greater than 19 mm, the volume of the optical engine will significantly increase as the total length of the optical engine increases.

To achieve the above purpose, the present disclosure also provides an AR device comprising a projection surface 30 and the optical engine as described above.

Please pay attention that as the AR device of the present disclosure includes all embodiments of the optical engine as described above, the AR device of the present disclosure has all the beneficial effects of the optical engine described above, and will not be described here.

The above embodiments are only some of the embodiments of the present disclosure, and are not intended to limit the patent scope of the present disclosure. Under the inventive concept of the present disclosure, equivalent structural transformations made using the description and drawings of the present disclosure or direct/indirect applications in other related technical fields, are fall within the scope of the present disclosure.

What is claimed is:

1. An optical engine, comprising:
   a self-luminous display chip; and
   a lens assembly provided on a light outlet side of the self-luminous display chip,
   wherein the lens assembly comprises at least three lenses,
   wherein the lens assembly comprises a first lens, a second lens and a third lens sequentially from an image side to an object side of the lens assembly, and the third lens is positioned between the second lens and the self-luminous display chip,
   wherein the first lens is a positive meniscus lens,
   wherein the second lens is a negative meniscus lens,
   wherein the third lens is a biconvex lens, and
   wherein the first lens comprises a first surface and a second surface, and both the first surface and the second surface are spherical surfaces.

2. The optical engine of claim 1,
   wherein the second lens comprises a third surface and a fourth surface, and both the third surface and the fourth surface are even order aspherical surfaces, and
   wherein the third lens comprises a fifth surface and a sixth surface, and both the fifth surface and the sixth surface are even order aspherical surfaces.

3. The optical engine according to claim 1, wherein the self-luminous display chip is a Micro LED self-luminous display chip or a FL-LCOS self-luminous display chip.

4. The optical engine of claim 1, wherein a total focal length of the lens assembly ranges from 10 to 13 mm.

5. The optical engine according to claim 1, wherein a total length of the optical engine ranges from 17 to 19 mm.

6. The optical engine according to claim 1, wherein the optical engine further comprises:
   a light uniform structure positioned between the lens assembly and the self-luminous display chip; and
   a chip protection glass provided on a surface of the self-luminous display chip.

7. An AR device comprising the optical engine of claim 1 and a projection surface.

8. An optical engine, comprising:
   a self-luminous display chip; and
   a lens assembly provided on a light outlet side of the self-luminous display chip,
   wherein the lens assembly comprises at least three lenses,
   wherein the lens assembly comprises a first lens, a second lens and a third lens sequentially from an image side to an object side of the lens assembly, and the third lens is positioned between the second lens and the self-luminous display chip, wherein the first lens is a positive meniscus lens,
wherein the second lens is a biconcave lens,
wherein the third lens is a positive meniscus lens, and
wherein the third lens comprises a fifth surface and a sixth surface, and both the fifth surface and the sixth surface are spherical surfaces.

9. The optical engine of claim 8, wherein the first lens comprises a first surface and a second surface, and both the first surface and the second surface are even order aspherical surfaces, and
wherein the second lens comprises a third surface and a fourth surface, and both the third surface and the fourth surface are even order aspherical surfaces.

* * * * *